United States Patent [19]

Freeman

[11] 4,105,635

[45] Aug. 8, 1978

[54] MANUFACTURE OF AROMATIC POLYMERS CONTAINING KETONE AND SULPHONE GROUPS

[75] Inventor: John Leslie Freeman, St. Neots, England

[73] Assignee: Imperial Chemical Industries Limited, Great Britain

[21] Appl. No.: 810,728

[22] Filed: Jun. 28, 1977

[30] Foreign Application Priority Data

Jul. 12, 1976 [GB] United Kingdom .............. 28841/76

[51] Int. Cl.$^2$ ............................................. C08G 65/40
[52] U.S. Cl. .................................. 528/126; 528/125; 528/174; 528/175; 528/212; 528/218; 528/219
[58] Field of Search .................... 260/49, 50, 47 R, 61

[56] References Cited

U.S. PATENT DOCUMENTS 3,647,751  3/1972  Darsow ................................. 260/49
3,928,295  12/1975  Rose ................................ 260/79.3 M

*Primary Examiner*—Lester L. Lee
*Attorney, Agent, or Firm*—Cushman, Darby & Cushman

[57] ABSTRACT

Aromatic polyetherketones and polyether sulphones are prepared from a hydrated alkali metal bisphenate by heating a substantially equimolar mixture of the bisphenate and an activated aromatic dihalide in the presence of an aromatic sulphone to distil off the water, preferably at atmospheric pressure, and then heating at temperatures in the range 250° to 400° C to effect polymerisation.

10 Claims, No Drawings

MANUFACTURE OF AROMATIC POLYMERS CONTAINING KETONE AND SULPHONE GROUPS

This invention relates to the manufacture of aromatic polymers and in particular to the manufacture of aromatic polyetherketones and polyethersulphones.

One method for the manufacture of such polymers is described in United Kingdom patent specification No. 1,078,234 wherein a dialkali metal salt of a bisphenol (hereinafter termed a bisphenate) is polycondensed with an aromatic dihalide in which the halogen atoms are activated by electron withdrawing groups, e.g. —SO$_2$— or —CO—, ortho or para to the halogen atoms. It is stressed in that specification that the reaction should be carried out under substantially anhydrous conditions and, to that end, any water present, which may result from the use of aqueous alkali solutions employed to make the bisphenate in situ, is removed by azeotropic distillation prior to addition of the dihalide.

It has also been proposed in our United Kingdom patent specification No. 1,414,421 to make aromatic polyetherketones and etherketone/sulphone copolymers using a preformed hydrated bisphenate which is dehydrated, in the presence of an aromatic sulphone solvent, prior to addition of an aromatic dehalide which is then poly-condensed with the dehydrated bisphenate.

In Canadian Pat. No. 847,963 it was proposed to make aromatic polyethers by reaction of a bisphenol with an activated dihalide and an alkali metal carbonate. It is suggested in that specification that the carbonate reacts with the bisphenol forming alkali metal bicarbonate as a byproduct, and that this bicarbonate then decomposes producing, inter alia, water. That specification indicates that removal of the water is not essential, because at the stage of water formation, the polymerisation reaction is already well under way. Even so, removal of the water is preferred in order to ensure the formation of a high molecular weight polymer.

Where the activated dihalide has to be added after water removal, the reaction vessel has to be opened when hot and hence there is a risk of the ingress of air which is liable to promote degradation and/or branching, of the polymer. While any such air can be flushed out with, e.g. nitrogen, such steps are time consuming and hence it is advantageous simply to charge all the reactants to the vessel, flush with nitrogen, and then effect polycondensation.

We have found that, surprisingly, satisfactory polymers can be made using a hydrated bisphenate without the necessity for dehydration before addition of the activated dihalide.

Accordingly we provide a process for the production of an aromatic polyethersulphone and/or ketone comprising distilling off the water from a substantially equimolar mixture of a finely divided hydrated dialkali metal salt of a bisphenol and an aromatic dihalide in which the halogen atoms are activated by —SO$_2$— or —CO— groups ortho or para thereto in the presence of an aromatic sulphone solvent and thereafter heating at a temperature in the range 250° to 400° C to effect polymerisation.

Bisphenols that may be employed are listed in aforesaid United Kingdom patent specifications Nos. 1,078,234 and 1,414,421. Preferred bisphenols include hydroquinone 4,4'-dihydroxydiphenylsulpone, 4,4'-dihydroxybenzophenone and 2,2-bis-(4-hydroxyphenyl) propane. The bisphenol may be converted to the hydrated, finely divided bisphenate, by reacting the bisphenol with an aqueous solution of an alkali metal hydroxide followed by separation of the hydrated bisphenate by drying: the drying conditions employed are such as to produce the hydrated bisphenate in a suitably finely divided form, preferably of particle size below 1 mm, particularly below 500 μm.

For the bisphenate formed from 4,4'-dihydroxydiphenylsulphone or 4,4'-dihydroxybenzophenone, spray drying is a particularly suitable way of obtaining the hydrated bisphenate.

The bisphenate is preferably the disodium or dipotassium salt, particularly the latter.

The aromatic dihalides employed preferably have the formula

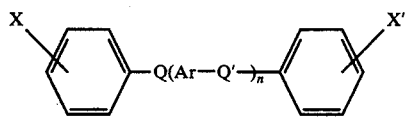

where X and X' (which may be the same or different) are halogen (particularly chlorine, fluorine or bromine) and are ortho or para, particularly the latter, to the groups Q (and Q'), Q and Q' (which may be the same or different) are —CO— or —SO$_2$—, Ar is a divalent aromatic radical, particularly phenylene or biphenylylene, and $n$ is 0, 1, 2 or 3.

Examples of dihalides include
4,4'-dichlorobenzophenone
4,4'-difluorobenzophenone
4,4'-dichlorodiphenylsulphone
1,4 (and 1,3) bis-(4-chlorobenzoyl) benzene
4,4'-bis-(4-chlorobenzoyl) biphenyl
4,4'-bis-(4-chlorophenylsulphonyl) biphenyl
bis-[4'-(4-chlorophenylsulphonyl) biphenyl-4-yl] sulphone
4-[4'-(4-chlorophenylsulphonyl) biphenyl-4-yl] sulphonyl-4'-(4-flourophenylsulphonyl) biphenyl
4,4'-bis-[4'-(4-chlorophenylsulphonyl) biphenyl-4-yl]sulphonyl biphenyl
4,4''-bis-(4-chlorophenylsulphonyl) p-terphenyl.

The preferred dihalides are selected from 4,4'-dihalodiphenylsulphones, 4,4'-dihalobenzophenones, 1,4 (and 1,3) bis-(4-halobenzoyl) benzenes, and 4,4'-bis-(4-halophenylsulphonyl) biphenyls.

Mixtures of bisphenates and/or mixtures of dihalides may be employed so as to give copolymers.

For cost reasons the dihalide is preferably 4,4'-dichlorodiphenylsulphone alone, or in conjunction with 4,4'-bis-(4-chlorophenylsulphonyl) biphenyl, 4,4'-dichlorobenzophenone and/or 1,4-bis-(4-chlorobenzoyl) benzene, while the bisphenate is preferably a dialkali metal salt of 4,4'-dihydroxydiphenylsulphone or 4,4'-dihydroxybenzophenone.

Aromatic sulphones that may be employed as the solvent are those sulphones having the formula

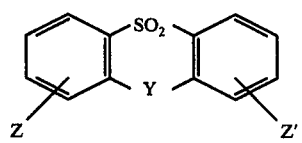

in which Y is a direct link, an oxygen atom or two hydrogen atoms (one attached to each benzene ring) and Z and Z', which may be the same or different, are hydrogen atoms or phenyl groups.

Examples of such aromatic sulphones include diphenyl sulphone, benzothiophen dioxide, phenoxathiin dioxide and 4-phenylsulphonylbiphenyl.

After charging the reactants to the polymerisation vessel the bisphenate is dehydrated. This is effected by distilling off the water of hydration. Preferably this is done at atmospheric pressure, i.e. not employing vacuum distillation techniques as, if a vacuum is applied there is always the risk, particularly on plant scale operation, that air will be drawn into the vessel via any small leaks. After dehydration the temperature of the vessel contents is increased to the polymerisation temperature.

The polymerisation temperature employed will depend on the solvent used and the nature of the condensants. Thus, at the polymerisation temperature, the polymer should be completely soluble in the solvent. To achieve this it may be necessary to commence polymerisation at a relatively low temperature, e.g. 250° to 270° C, and then increase the temperature, e.g. to 280° to 350° C, in order to keep the polymer in solution as its molecular weight increases.

When polymerisation has proceeded to the desired extent, the reaction mixture is cooled and the polymer separated from the solvent and reaction byproduct (alkali metal halide), e.g. by comminution followed by leaching with solvents for the aromatic sulphone solvent and alkali metal halide.

Prior to cooling the reaction mixture, the polymerisation reaction may be terminated by the addition of an end-stopping reagent, e.g. a mono- or polyfunctional halide such as methyl chloride, t-butyl chloride, or 4,4'-dichlorodiphenylsulphone.

The invention is illustrated by the following examples.

EXAMPLE 1

A finely divided sample (particle size less than 500 μm) of the hydrated dipotassium salt of 4,4'-hydroxybenzophenone

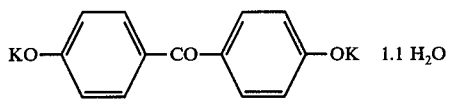

(24.9804 g; 0.0805 moles) prepared by drying an aqueous solution of the dipotassium salt using a rotary evaporator, 4,4'-dichlorobenzophenone (16.3382 g; 0.0651 moles), 4,4'-dichlorodiphenylsulphone (4.6712 g; 0.0163 moles) and diphenylsulphone (41 g) were mixed together and transferred to a flask fitted with a stirrer, nitrogen inlet, and condenser and receiver. The bisphenate comprised 49.72 mole % of the monomers (bisphenate + dihalides) and so there was a slight molar excess of the dihalides. The flask was heated, with stirring, to 230° C under a slow stream of nitrogen. Water distilled out. Five minutes after reaching 230° C the temperature was raised to 270° C and maintained for 3 hours. The temperature was then increased to 320° C and maintained for a further 3 hours. Thereafter polymerisation was terminated by addition of 4,4'-dichlorodiphenylsulphone (1 g). After a further 30 minutes the reaction mixture was then cooled, milled to a particle size of less than 1 mm, washed once with boiling acetone, once with boiling aqueous acetic acid solution (containing 1% by weight of acetic acid) and then Soxhlet extracted with a mixture of equal volumes of methanol and acetone for 16 hours. The reduced viscosity of the resultant polymer (measured at 25° C) was 1.54 and the absorbance was 0.3.

Reduced viscosity and absorbance quoted herein were measured on a solution of the polymer in concentrated sulphuric acid (density 1.84 g.cm$^{-3}$) of concentration 1 g of polymer in 100 cm$^3$ of solution. The absorbance was measured at a wavelength of 550 nm in a 10 mm cell.

A sample of the polymer was formed into film by compression moulding for five minutes at 410° C using a 20 ton press and then cooling slowly to 200° C. The film was opaque and tough.

The pressure required to extrude a melt of the polymer at 400° C at a shear rate of 125 sec$^{-1}$ only rose slightly after maintaining for 90 minutes at that temperature.

EXAMPLE 2

Example 1 was repeated in a similar manner (except where mentioned below) using the following reagents: hydrated dipotassium salt of 4,4'-dihydroxydiphenylsulphone containing 7.09% water, i.e. approximately KOC$_6$H$_4$SO$_2$C$_6$H$_4$OK, 1.5 H$_2$O, (52.71 g, 0.1500 M), 4,4'-dichlorodiphenylsulphone (43.51 g, 0.1515 M, 1.0 M% excess), and diphenylsulphone (104.4 g). The reagents were reacted at 230° C for 1 hour, and then at 285° C for 24 hours: then, to terminate the polymerisation, methyl chloride gas was passed, via a syringe needle, through the viscous mixture still at 285° C for 0.5 hour. The toffee-like reaction product was milled and Soxhlet extracted by boiling with the following solvent mixtures: methanol/water (in the proportion of 7:2 by weight) for 6 hours, water/acetic acid (in the proportion of 17:1 by weight) for 16 hours, and finally, methanol/acetone (in the proportion of 7:2 by weight) for 2 hours.

The reduced viscosity (RV), measured at 25° on a solution of the polymer in N,N-dimethyl formamide said solution containing 1 g of polymer in 100 cm$^3$ of solution was 0.64 (the RV had in fact reached 0.59 after only 6½ hours at 285° C). A sample of the polymer was formed into film by compression moulding at 20 tons for 5 minutes at 300° C and then rapid cooling to 150° C. The film was clear, almost colourless (very pale amber) and tough.

I claim:
1. A process for the production of an aromatic polyethersulphone and/or ketone comprising distilling off the water from a substantially equimolar mixture of a finely divided hydrated dialkali metal salt of a bisphenol and an aromatic dihalide in which the halogen atoms are activated by —SO$_2$— or —CO— groups ortho or para thereto in the presence of an aromatic sulphone solvent and thereafter heating at a temperature in the range 250° to 400° C to effect polymerisation.

2. A process according to claim 1 wherein the dialkali metal salt is a dialkali metal salt of a bisphenol selected from the group consisting of hydroquinone, 4,4'-dihydroxydiphenylsulphone, 4,4'-dihydroxybenzophenone and 2,2-bis-(4-hydroxyphenyl) propane.

3. A process according to claim 1 wherein the hydrated bisphenate has a particle size below 1 mm.

4. A process according to claim 1 wherein the aromatic dihalide has the formula

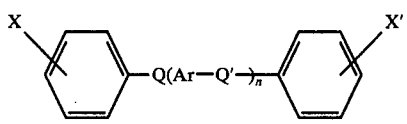

where X and X' (which may be the same or different) are halogen and are ortho or para, to the groups Q (and Q'); Q and Q' (which may be the same or different) are —CO— or —SO$_2$—, Ar is a divalent aromatic radical, and $n$ is 0, 1, 2 or 3.

5. A process according to claim 4 wherein the dihalide is selected from the group consisting of dihalodiphenylsulphones; 4,4'-dihalobenzophenones; 1,4 (and 1,3) bis-(4-halobenzoyl) benzenes, and 4,4'-bis-(4-halophenylsulphonyl) biphenyls.

6. A process according to claim 5 wherein the dihalide is 4,4'-dichlorodiphenylsulphone or a mixture of 4,4'-dichlorodiphenylsulphone in admixture with at least one compound selected from the groups consisting of 4,4'-bis-(4-chlorophenylsulphonyl) biphenyl, 4,4'-dichlorobenzophenone and 1,4-bis-(4-chlorobenzoyl) benzene.

7. A process according to claim 1 wherein the aromatic sulphone solvent has the formula

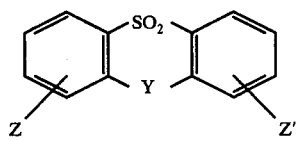

in which Y is a direct link, an oxygen atom or two hydrogen atoms (one attached to each benzene ring) and Z and Z', which may be the same or different, are hydrogen atoms or phenyl groups.

8. A process according to claim 7 wherein the aromatic sulphone solvent is diphenyl sulphone.

9. A process according to claim 1 wherein the water is removed by distillation at atmospheric pressure.

10. A process according to claim 1 wherein, after dehydration of the bisphenate, the polymerisation is conducted initially at 250° to 270° C and then the temperature increased and polymerisation concluded at a temperature in the range 280° to 350° C.

* * * * *